United States Patent
Litteaut et al.

(10) Patent No.: US 6,621,897 B1
(45) Date of Patent: Sep. 16, 2003

(54) MULTICHANNEL DYNAMIC TELEPHONE LINK AND METHOD OF OPERATING IT

(75) Inventors: Jacques Litteaut, Marly le Roi (FR); Nhut Quan Tran, Cergy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/523,189

(22) Filed: Mar. 10, 2000

(30) Foreign Application Priority Data

Mar. 22, 1999 (FR) ............................................. 99 03515

(51) Int. Cl.⁷ .............................. H04M 7/00; H04M 3/00
(52) U.S. Cl. ........................................ 379/219; 379/196
(58) Field of Search ........................... 379/219, 220.01, 379/229, 230, 188, 190, 192, 196–198; 370/360, 395.63, 498

(56) References Cited

U.S. PATENT DOCUMENTS

| | | | |
|---|---|---|---|
| 5,454,033 A | 9/1995 | Hahn et al. .................. | 379/188 |
| 5,864,613 A | 1/1999 | Flood ......................... | 379/198 |
| 5,930,347 A * | 7/1999 | Louvel .................. | 379/215.01 |

OTHER PUBLICATIONS

Le Gourrierec M.: "Reseau Prive A Integration de Services Utilisant Parallelement Lignes Louees et Circuits du Reseau Public Commute" L'Onde Electrique, vol. 72, (1992) Sep.–Oct., No. 5, p. 29–35, XP000312078 ISSN: 0030–2430.

* cited by examiner

Primary Examiner—Benny Tieu
(74) Attorney, Agent, or Firm—Sughrue Mion, PLLC

(57) ABSTRACT

A multichannel dynamic telephone link provisionally sets up an internode medium connecting two nodes of a telephone network and including a plurality of channels each carrying a call between the two nodes. Time-delayed controllers associated with respective channels each assume a measurement state or an overshoot state or a latent state according to whether a call has been supported by the channel associated with the controller for a time less than an authorized duration or a call has been supported by the channel for a time at least equal to the authorized duration or no call has been supported by the channel, respectively. They clear down the internode medium when none of the time-delayed controllers is in its measurement state. One particular application is to private networks including a dynamic link via a public network.

6 Claims, 2 Drawing Sheets

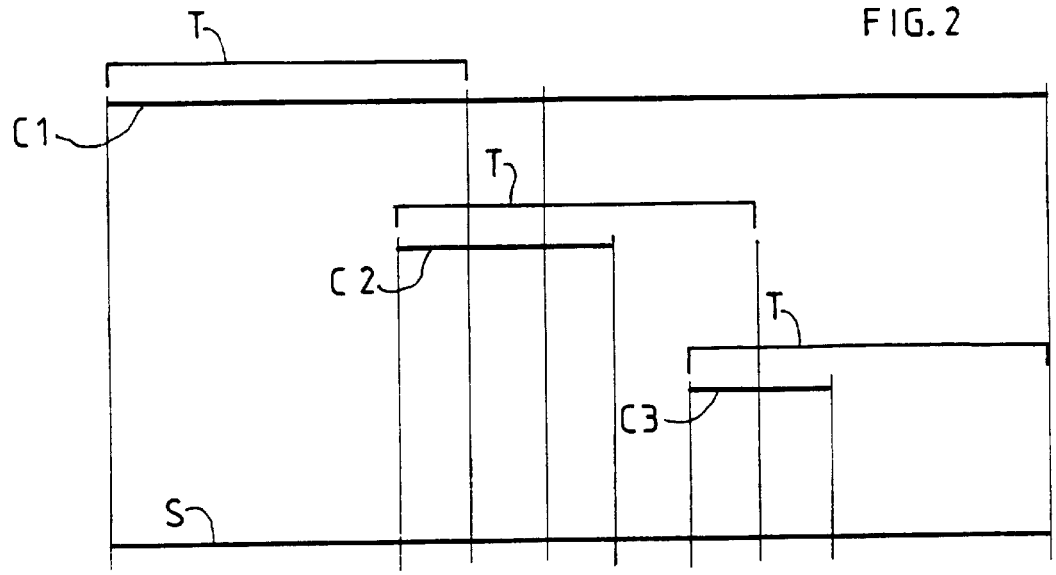
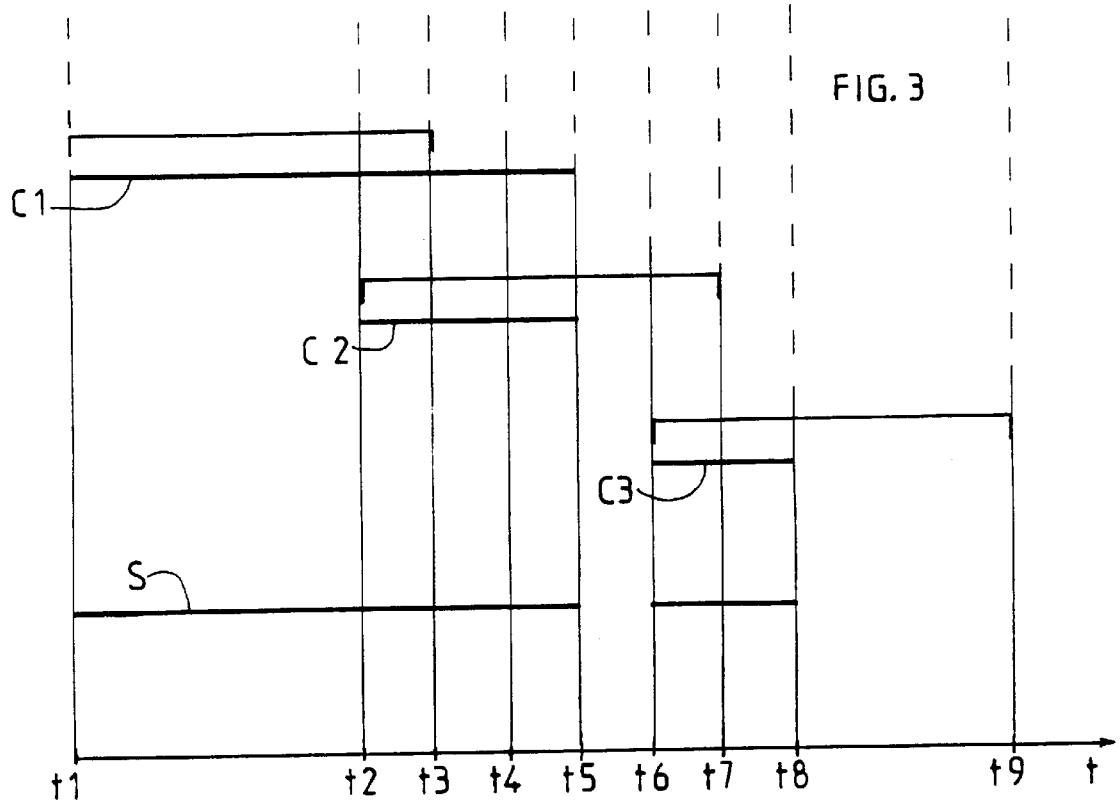

MULTICHANNEL DYNAMIC TELEPHONE LINK AND METHOD OF OPERATING IT

BACKGROUND OF THE INVENTION

1. Field of the Invention

The present invention relates to telephone networks and more particularly to private telephone networks which use a public telephone network for limited periods to route some calls.

2. Description of the Prior Art

Using a public network in this way is known to be economically justified in some private networks because the overall cost is less than the investment in the private network that would have been required to enable it to route all the required calls internally. To enable the public network to be used whenever necessary, the manufacturer of the private network incorporates into it resources which are sometimes referred to as a "dynamic link". A dynamic link is able to set up a "medium" for a call on which voice or data signals of the call are exchanged between two nodes of the network. While it exists, the medium uses resources of the public network at least over an intermediate part of its path. The proprietor of the private network is billed for such use, the cost of which increases with the time for which the resources are used. This is why the link is a "dynamic" link and able to set up and clear down the medium.

The medium is typically set up each time there is a call to be set up on the medium between the two nodes and the medium has previously been cleared down. It is cleared down whenever there is no longer any call in progress.

A dynamic link can be a "multichannel" link. The medium that it sets up is then used to route several telephone calls simultaneously between the two nodes connected by the link.

It has been found that the medium of a multichannel dynamic link is sometimes retained unnecessarily because private network users forget to terminate calls using the medium. This is why a prior art method of operating a link of this kind seeks to obtain a financial advantage by limiting the duration of such unnecessary retention. In the prior art method, if only one call is in progress on the medium, the medium is cleared down when the time which has elapsed since the start of the call reaches a predetermined authorized duration, such as one hour. If several calls which were started separately are in progress simultaneously, the prior art method clears down the medium if the time that has elapsed since the most recent start reaches the authorized duration.

The prior art method has an advantage if a call reaches the authorized duration at a particular time although, from the technical point of view, it would be beneficial for it to be able to exceed that duration and at the same time there is another call in progress which has a duration less than the authorized duration. The advantage is that, in this case, clearing down, which then has no financial advantage, is prevented for the first of the two calls.

However, the prior art method has the disadvantage that in the presence of a first call of the above kind the medium is too often retained for an excessively long time, and possibly indefinitely, because of the setting up of other calls which have durations very much less than the authorized duration and between which there are intervals during which only the first call continues.

A general object of the present invention is to limit the operating cost of a multichannel dynamic telephone link with limited risk of interrupting a useful call.

A particular object of the present invention is to retain the above advantage of the prior art method but to avoid the above disadvantage thereof.

SUMMARY OF THE INVENTION

To achieve the above objects, the invention provides a multichannel telephone link including means for provisionally setting up an internode medium connecting two nodes of a telephone network and including a plurality of channels each adapted to carry a call between the two nodes, a plurality of time-delayed controllers associated with respective channels and each adapted to assume a measurement state or an overshoot state or a latent state according to whether a call has been supported by the channel associated with the controller for a time less than an authorized duration or a call has been supported by the channel for a time at least equal to the authorized duration or no call has been supported by the channel, respectively, and means for clearing down the internode medium when none of the time-delayed controllers is in its measurement state.

How the invention can be put into effect is described hereinafter, by way of example only and with reference to the accompanying drawings.

BRIEF DESCRIPTION OF THE DRAWINGS

FIG. 2 is a timing diagram for the operation of a multichannel dynamic telephone link in accordance with the aforementioned prior art method.

FIG. 3 includes a timing diagram of the operation of the link shown in FIG. 1 and a time scale common to FIGS. 2 and 3.

DETAILED DESCRIPTION OF THE PREFERRED EMBODIMENT

Figure 1:
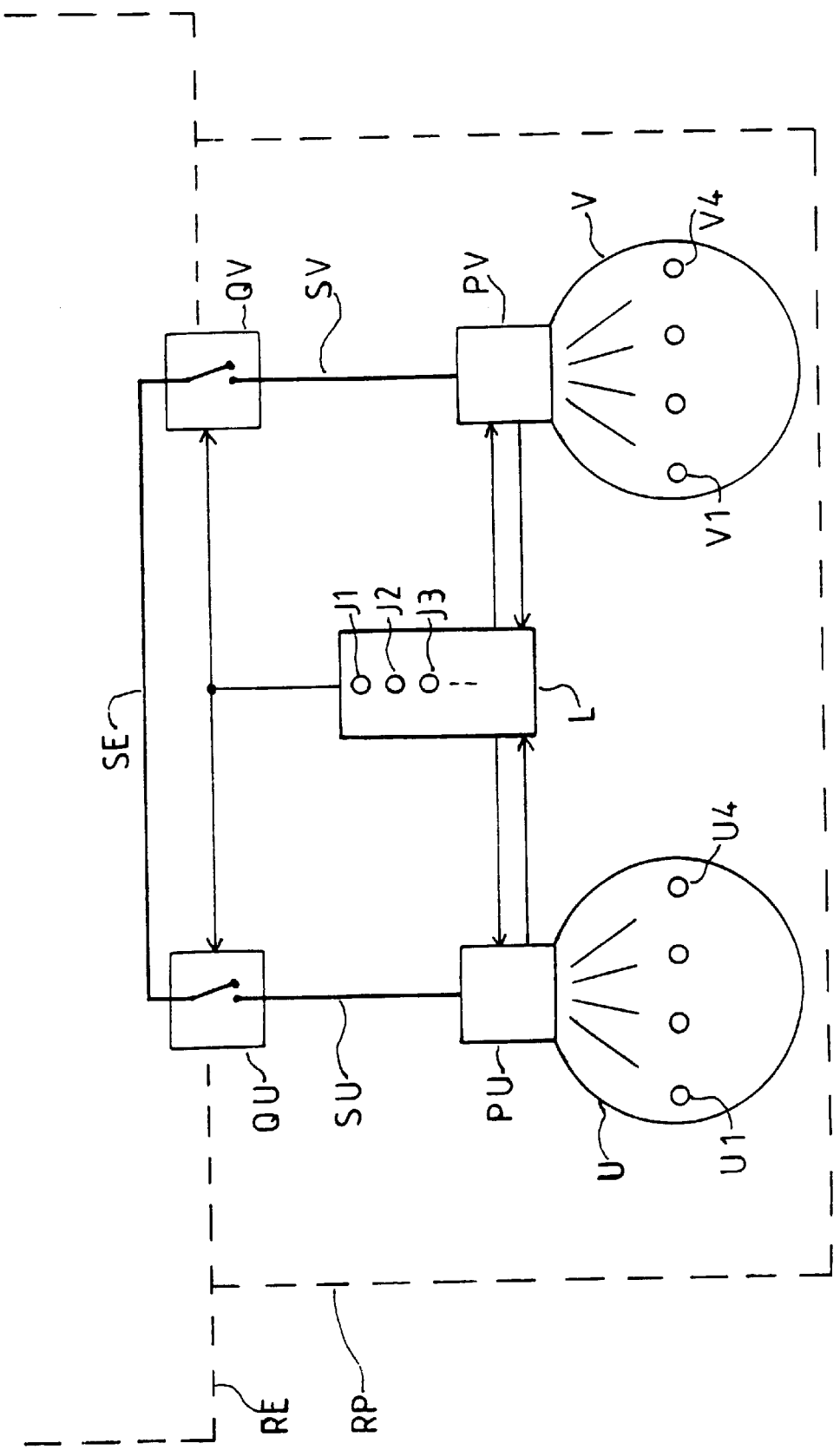
FIG. 1 is a block diagram of a link according to the invention.

Like a prior art multichannel dynamic telephone link, the link of the invention is constituted by a programmed system able in particular to effect alternating operations to set up and clear down a medium between nodes made up of three section SU, SE and SV. The medium is a communication medium connecting two ports PU and PV of respective nodes U and V such as two PABX included in the same private telephone network RP. Each of the two nodes includes a plurality of stations U1, ..., U4 and V1, ..., V4 controlled by respective users (persons, machines or systems) to enable those users to exchange voice or data signals. Some exchanges are in the form of internode calls between a calling station specific to the call and belonging to a calling node consisting of one of said two nodes and a called station specific to the call and belonging to a called node consisting of the other of said two nodes. Each station can operate equally well as a calling station and as a called station.

Each internode call is conventionally performed following a call request in respect of that call formulated by the calling station and designating the called node and the called station. The call then has a start, from which it is "in progress", i.e. from which it enables exchange of voice and/or data signals between the calling and called stations. It terminates when it is cleared down. A call such as call C2 or C3 in FIGS. 2 and 3 may be cleared down intentionally at a time such as t5 or t8 by the called or calling station. A call such as C1 can also be cleared down at a time such as t5 by clearing down the internode medium.

Each of the two nodes U and V responds to each call request for an internode call by connecting its port PU or PV to that of the calling and called stations of the call which belong to that node. In the case of the called node, the call request can be received by that node via the internode medium if the latter exists at the time but can also be received via other resources of the private network RP.

The method of operating the link includes various operations in response to each call request for an internode call, whether the method according to the invention or the prior art method is used.

A first such operation sets up the internode medium SU, SE, SV if the medium has not been set up already at the time of the call request. The medium includes a plurality of channels each enabling communication between the two ports. There are typically between two and thirty channels. For example, the medium includes six channels for exchanging voice signals and one channel for exchanging data signals in the form of packets according to the X.25 protocol. It is "compressed" in the sense that each call is compressed into time intervals which are separated from each other and whose common duration is approximately 32 ms. A plurality of respective time intervals of this kind is assigned to the plurality of channels of the medium during a transmission cycle. The cycles follow on from each other periodically for as long as the medium exists.

The medium typically takes a path of which at least one part SE belongs to a public telephone network RE, i.e. consists of resources such as lines and switches of that network. The use of those resources is billed to the proprietor of the network RP. The medium therefore represents a cost to the proprietor which increases with the duration of its existence.

It is set up, operated and cleared down by a link manager unit L which is supplied with information by the ports PA and PB. The means for setting up and clearing down the medium are symbolized by two switches QU and QV which are opened or closed simultaneously at the command of the management unit.

A second operation in response to a call request allocates one of the channels of the internode medium to the call for which the call request was formulated. This defines the start of the call and is the result of cooperation between the management unit L and the ports PA and PB. It is effected only if a channel is available on the medium, of course. If not, i.e. if all the channels of the medium are already busy with calls in progress, the call request fails, unless resources other than the internode medium can be used to set up the call requested by the call request.

The method then includes a call duration measurement operation. This operation measures the time which has elapsed since the start of the internode call. This time is referred to hereinafter as the "measured time". In the prior art link referred to above the measured time is that which has elapsed since the most recent internode call starts.

The method finally includes operations which clear down the internode medium. These operations include "authority" clearing down and "normal" clearing down.

Authority clearing down is effected each time that the measured time exceeds a predetermined authorized duration. The authorized duration is from 10 minutes to 200 minutes, for example, and more particularly from 30 minutes to 120 minutes. It is chosen by the manufacturer of the private network according to the nature of the work of network users.

Normal clearing down is effected each time there is no longer any internode call in progress.

The method according to the invention is characterized in that the call duration measuring operation measures the time that has elapsed since the respective start of each of the calls in progress. Each of these times constitutes one of the measured durations and an authority clearing down of the internode medium is effected each time that each of the measured durations exceeds the authorized duration.

The call duration is measured by the time-delayed controllers J1, . . . , J3 previously mentioned included in the management unit L. Each controller is in a measurement state, an overshoot state or a latent state according to whether a call has been supported by the channel associated with that controller for a time less than the authorized duration T or a call has been supported by that channel for a time at least equal to that authorized duration or no call has been supported by that channel, respectively. Authority clearing down is effected each time that each of one or more calls in progress has lasted longer than the authorized duration, i.e. each time that all the controllers associated with the channels carrying the calls are in the overshoot state, any other controllers being in their latent state.

Normal clearing down is effected as soon as all the controllers are in their latent state. Thus authority or normal clearing down is effected each time that each controller is either in its overshoot state or in a latent state, i.e. each time that none of the controllers is in its measurement state.

The controllers are typically implemented by program elements stored in the telephone switching offices that constitute the nodes U and V. They can take the form of permanent entities, each of which is permanently associated with one channel of the medium. However, they can equally well appear, at least when they are in their measurement or overshoot state, as if each were implemented in the form of a provisional entity created at the occasion of setting up a call on a channel of the medium and therefore associated both with the call and with the channel. This entity measures the time from the setting up of the call and is referred to as the "time control provisional entity". A provisional entity of this kind is destroyed by clearing down the associated call but an equivalent entity is created if another call is set up on the same channel. If a dynamic link uses such provisional entities it is necessary to specify the nature of the latent state previously referred to as possibly being at any given time that of each time-delayed controller associated with a channel of the medium. In this case the latent state of the controller is merely the absence at that time of any time control provisional entity associated with the channel.

FIGS. 2 and 3 show two sequences of operation of a multichannel dynamic telephone link following the same sequence of actions of users of the link, the differences between the two operating sequences resulting entirely from the fact that the link shown in FIG. 1 operates according to the prior art method previously referred to whereas the link shown in FIG. 3 operates according to the method of the present invention.

The sequence of user actions is as follows:

A first pair of users starts a call C1 at time t1 and the call continues usefully for a duration which terminates at time t4 and which is greater than the authorized duration T, which is reached at time t3. At time t4 the users forget to clear down the call, which is therefore prolonged unnecessarily.

At time t2 before time t3 a second pair of users starts a call C2. One of them clears down the call at time t5 later than time t4, although its duration has not reached the authorized duration, which extends to time t7.

At time t6 before time t7 a third pair of users starts a third call C3. One of them clears down the call at time t8 although its duration has not reached the authorized duration, which extends to time t9.

The duration of each call is represented by a thick "call" line. Another thick line S represents the period for which the internode medium S has existed. A time interval equal to the authorized duration T is represented by a thinner line running above each call line from the start of the corresponding call.

As shown in each of FIGS. 2 and 3, the presence of call C2 at time t3 prevents the medium S from being cleared down at that time, so enabling the call C1 to continue beyond the authorized duration.

As shown in FIG. 2 only, at the time t5 at which call C2 is cleared down the fact that the authorized duration has not yet been reached for that call causes the medium S to be retained and call C1 continues. At the time t7 at which the authorized duration is reached for call C2, the fact that call C3 is still in progress again causes the medium S to be retained and call C1 continues. At the time t8 at which call C3 is cleared down the fact that the authorized duration for the latter call has not yet been reached again causes the medium to be retained. It is only at time t9 that the end of the authorized duration leads to authority clearing down of the medium S and the corresponding authority clearing down of call Cl. The medium was therefore retained unnecessarily during time intervals t5–t6 and t8–t9.

In FIG. 3, the authority clearing down occurs at time t5 because, from time t5, the only measured time is that which has elapsed since the start at t1 of call C1 and the measured time has exceeded the authorized duration T. Thus at no time has the medium S been retained unnecessarily.

This example, which relates to a particular situation, shows that, by virtue of the present invention, there will be few cases where a wanted call will be cut off by authority clearing down of the medium S and unnecessary retention of the medium will be limited.

There is claimed:

1. A multichannel telephone link including means for provisionally setting up an internode medium connecting two nodes of a telephone network and including a plurality of channels each adapted to carry a call between said two nodes, a plurality of time-delayed controllers associated with respective channels and each adapted to assume a measurement state or an overshoot state or a latent state according to whether a call has been supported by said channel associated with said controller for a time less than an authorized duration or a call has been supported by said channel for a time at least equal to said authorized duration or no call has been supported by said channel, respectively, and means for clearing down said internode medium when none of said time-delayed controllers is in its measurement state.

2. A link as claimed in claim 1, further including means for creating at the start of each call supported by a channel of said internode medium a time-delay controller associated with said channel in the form of a time control provisional entity associated with said call and said channel and means for destroying said entity on clearing down said call, and wherein said controller is in said latent state whenever there is no time control provisional entity associated with said channel.

3. The link claimed in claim 1 wherein said plurality of channels of said internode medium is implemented by repetitive assignment to said channels of said medium of a respective plurality of successive time intervals.

4. The link claimed in claim 3 wherein the number of said channels of said internode medium is from 2 to 30.

5. The link claimed in claim 1 wherein said authorized duration is from 10 minutes to 200 minutes.

6. A method of operating a multichannel dynamic telephone link constituted by a programmed system able to perform alternating operations to set up and clear down an internode communication medium connecting two ports of two respective nodes of a telephone network, wherein each of said two nodes includes a plurality of stations controlled by respective users to enable said users to exchange voice or data signals, internode calls are each effected between a calling station specific to said call and belonging to a calling node consisting of one of said two nodes and a called station specific to said call and belonging to a called node consisting of the other of said two nodes, each of said two stations is adapted to constitute a calling station and to constitute a called station, each said internode call is effected following a call request for said call, said call request is formulated by said calling station and designates said node and said called station, said call then has a start from which it is in progress to enable exchange of voice and/or data signals between said calling and called stations, said call terminates at clearing down of said call which can be intentional and caused by one or other of said calling and called stations or an authority clearing down caused by the clearing down of said internode medium, and each of said two nodes responds to each call request for an internode call by connecting its port to that of said calling and called stations of said call which belongs to that node, said link operating method including the following operations in response to each call request for an internode call:

setting up said internode medium if said medium does not exist, said medium including a plurality of channels each enabling a call between said two ports, assigning one of said channels of said medium to said call for which said call request was formulated so as to define said start of said call, a call time measuring operation including measuring each of the times that has elapsed since the respective starts of said calls in progress, each of said times constituting one of said measured times, said times constituting measured times, and said operations of clearing down said internode medium, which include authority clearing down operations effected each time that each of said measured times exceeds a predetermined authorized duration and normal clearing down operations effected as soon as no internode call is still in progress.

* * * * *